March 19, 1957 L. FARNSWORTH Re. 24,289

CONTROL AND FEED MECHANISM FOR CENTERING AND DRILLING MACHINES

Original Filed Jan. 13, 1955 2 Sheets-Sheet 1

INVENTOR:
Lawrence Farnsworth
by James E. Nilles
Attorney

CONTROL AND FEED MECHANISM FOR CENTERING AND DRILLING MACHINES

Original Filed Jan. 13, 1955 2 Sheets-Sheet 2

INVENTOR:
Lawrence Farnsworth
by James E. Nilles
Attorney

United States Patent Office

Re. 24,289
Reissued Mar. 19, 1957

24,289

CONTROL AND FEED MECHANISM FOR CENTERING AND DRILLING MACHINES

Lawrence Farnsworth, Racine, Wis., assignor of fifty percent to Max Seft, Racine, Wis.

Original No. 2,732,737, dated January 31, 1956, Serial No. 481,625, January 13, 1955. Application for reissue October 22, 1956, Serial No. 617,673

15 Claims. (Cl. 77—18)

Matter enclosed in heavy brackets [ ] appears in the original patent but forms no part of this reissue specification; matter printed in italics indicates the additions made by reissue.

This invention relates to centering and drilling machines of the type wherein the workpiece is rotatably driven and, more particularly, it relates to an improved control and feed mechanism therefor.

The invention is in the nature of an improvement over the machine forming the subject matter of my co-pending United States application Serial Number 426,960, filed May 3, 1954, *now Patent No. 2,732,735 issued January 31, 1956.* Machines of this type find particular utility in centering and drilling the ends of small cylindrical workpieces, for example, small electric motor shafts. The tolerances to which the machining of such shafts must be held are extremely close and maintaining the proper concentricity of the centers and holes in the ends of these shafts has been a very troublesome problem. With a machine of the type to which this invention pertains, it is possible to completely finish the external diameter of the workpiece before centering and drilling the ends. Furthermore, by rotating the workpiece and maintaining the tool stationary, concentricity can be held to very close limits, distortion of the ends eliminated, and breakage of the tools substantially reduced.

A general object of this invention is to provide an improved centering and drilling machine of the type in which the workpiece is rotatably driven, which is highly efficient in performing the functions for which it is designed.

Another object of this invention is to provide an improved control mechanism for a centering and drilling machine of the above type, having a single control lever capable of clamping the workpiece in operating position, positioning the drive mechanism to rotatably drive the piece, feeding the tool into operative engagement with the piece and actuating the lubricating means to supply a predetermined amount of lubricant.

Another object of this invention is to provide a highly compact and efficient centering and drilling machine having a control mechanism operable by a single lever whereby the capacity of the machine is greatly increased and operator's fatigue reduced.

A still further object of this invention is to provide a new and novel lubricating means for a centering and drilling machine which supplies lubricant to the tool in an efficient manner at only the proper time in its cycle and in a predeterminable amount.

Other objects and advantages of this invention will become more apparent as this disclosure progresses, reference being had to the accompanying drawings, in which.

Figure 1:
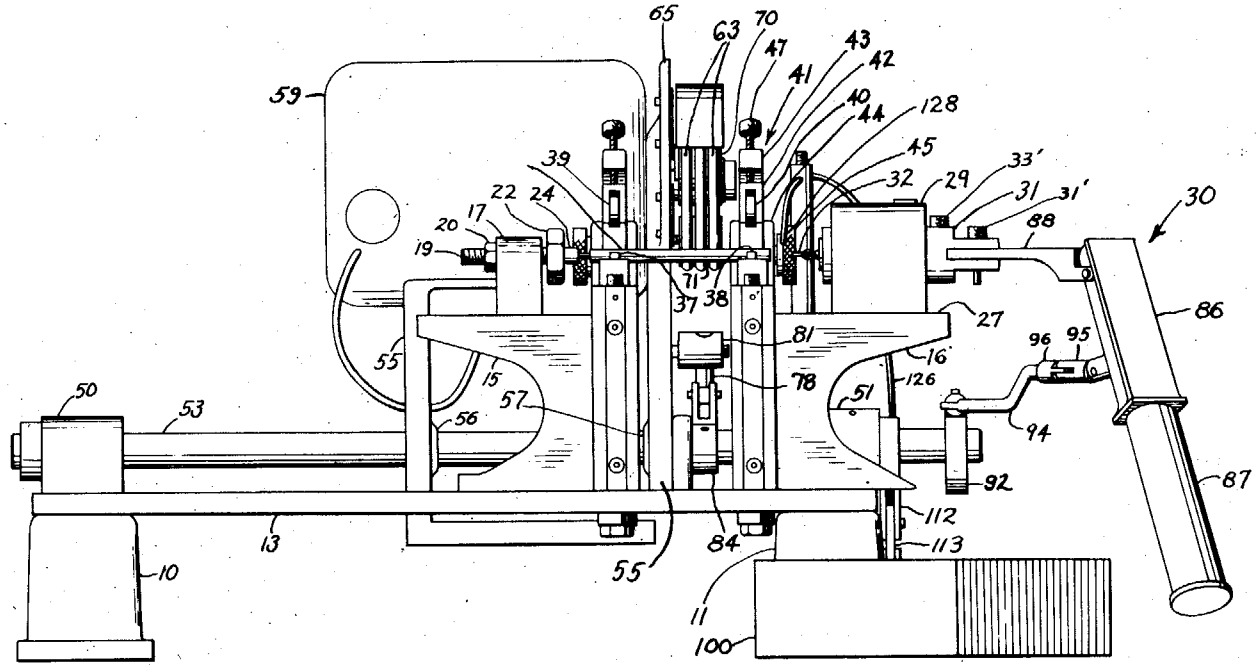
Figure 1 is an elevational front view of the machine embodying this invention.

Referring more particularly to the drawings, the main frame or support structure comprises spaced leg members 10, 11 secured together by bed plate 13. Table members 15, 16 are adjustably secured in a longitudinally arranged slot (not shown) in plate 13 and thereby positionable along the length thereof to accommodate workpieces of various lengths. Table 15 has a longitudinally arranged groove along its top surface in which is slidably secured the tailstock 17 by means of a cap screw (not shown) extending through table 15 from the underside and into a tapped hole in tailstock 17. A depth adjusting screw 19 is threadably engaged in tailstock 17 and extends therethrough and a lock nut 20 retains it securely in position. Rotatably mounted within the head 22 of screw 19 is the stop member 24 which absorbs the thrust of the workpiece 25 bearing against it.

Figure 2:
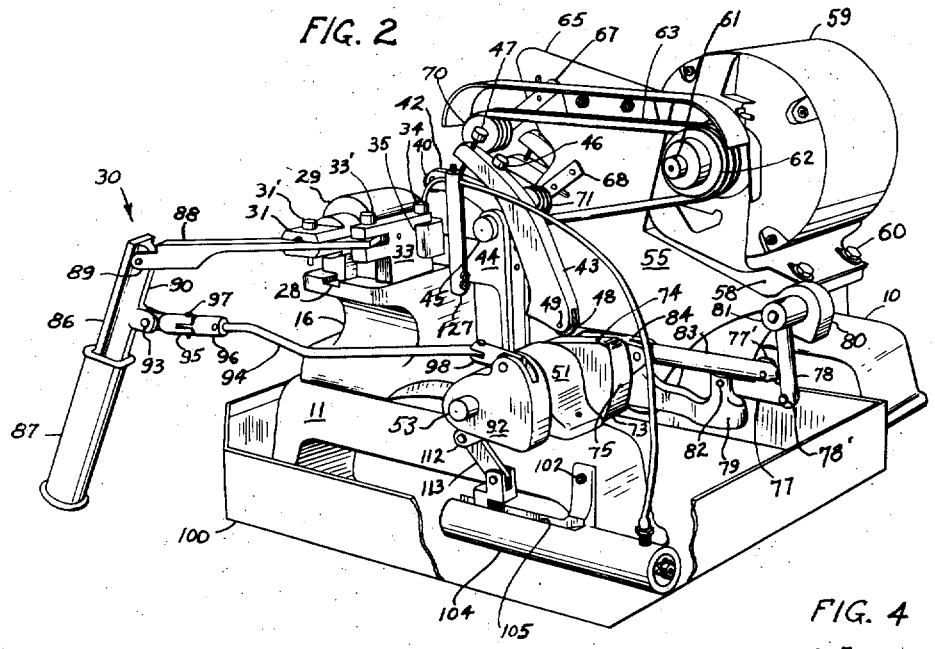
Figure 2 is a perspective view taken from the left, rear side of the machine showing the control mechanism and lubricant supplying means, with parts broken away.

To the top surface 27 of table 16 is adjustably secured in groove 28 the headstock 29 through which slidably extends, in a close fitting bore, the tool holder 31. Lockable within holder 31 is the non-rotatable centering or drilling tool 32. As shown in Figure 2, a swinging arm 33 is pivotally secured at one of its bifurcated ends by cap screw 34 to a rearwardly extending ear portion 35 of headstock 29. A compound control handle 30 is pivotally secured to the other bifurcated end of arm 33 by thumb screw 33' and also pivotally secured intermediate its length to tool holder 31 by thumb screw 31'.

As seen in Figure 1, the means for rotatably supporting the workpiece 25 comprises two pairs of transversely aligned anti-friction supporting rollers 37, 38 (only the front roller of each pair being shown) mounted on the upper portions of tables 15, 16 respectively. The rollers are transversely adjustable on their tables so as to accommodate various diameter workpieces. Reference may be had to my above identified co-pending application for a full description of these holders and their adjusting means. However, it is sufficient to say here that these pairs of support rollers accurately support the workpiece while it is rotatably driven. In practice, workpiece speeds as high as 15,000 R. P. M. have been employed. An upper clamping roller 39, 40 is provided for each pair of holding rollers 37, 38. Only one clamping roller 40 will be described as the construction, support and actuation of clamping roller 39 is identical. Roller 40, which is of the high-speed, anti-friction type, is rotatably mounted on the forward end of compound arm 41 comprised of arm portions 42, 43 each pivoted on an upstanding portion 44 of support structure 16 by means of thumb screw 45. Arm portions 42, 43 may be considered as one integral arm 41 but the relative position between arm portions 42, 43 may be varied as follows to accommodate different diameter workpieces. A set screw 46 extends freely through a hole in arm portion 43 and is threadably engaged in arm portion 42. An adjusting set screw 47 is threadably engaged in arm portion 43 and bears against the upper surface of arm portion 42. When screw 46 is loosened, screw 47 may be adjusted to vary the distance of clamping roller 40 from its corresponding support rollers 38 after which screw 46 is again tightened. This adjustment makes it possible for the clamping roller 40 to bear firmly against the workpiece so as to hold it positively without any play and yet at the same time allows it to be freely rotatable for being driven at high speeds. The lower end of arm 41 has rotatably secured thereto a cam follower roller 48 by means of pin 49. The clamping rollers 39, 40 are thus swung downwardly into operative engagement with the workpiece or upwardly into an inoperative position by the swinging of arms 41 about their screws 45.

Brackets 50, 51 which are secured to leg members 10,

11 respectively, rotatably support a main actuating member in the form of shaft 53. Rotatably secured on this shaft 53, for rotation thereabout, is the means for rotatably driving the cylindrical workpiece 25. This driving means is also fully described in my said co-pending application and a brief description will suffice here. A drive frame 55 is rotatably mounted on shaft 53 at 56 and 57 and has a flat upper surface 58 to which the electric motor 59 is secured by bolts 60. The motor shaft 61 has a multiple V pulley 62 over which is trained a plurality of flexible driving belts 63. Adjustably secured to an upstanding portion 65 of drive frame 55 by means of arms 67, 68 are multiple sheaves 70, 71, respectively. Belts 63 are also trained over sheaves 70, 71 and in the driving position, that portion of the belts between sheaves 70, 71 embrace a substantial portion of the periphery of the workpiece 25 to rotate it at a very high speed. This driving position is obtained when the drive frame 55 is rotated or swung forwardly about shaft 53 by means to be described.

At spaced locations on shaft 53 are secured two cams 73 (only one shown) one for each arm 41 of clamping rollers 39, 40. These cams 73 have a positioning surface 74 and a holding surface 75. As the shaft 53 is rotated in a counterclockwise position, as viewed in Figure 2, the rollers 39, 40 will bear against the workpiece 25 at the time the cam follower 48 reaches the point on the cams 73 where surfaces 74 and 75 intersect, assuming, of course, that the adjusting screw 47 has been properly set for the size of the workpiece involved. Continued rotation of shaft 53 causes cam follower to ride on the cam "holding" surface 75 which is formed as an arc whose center is the center of shaft 53. Therefore, clamping roller 40 is held firmly and positively with an even amount of pressure against the workpiece as follower 48 rides on surface 75 and is held thereon. It is while follower 48 is moving along cam "holding" surface 75 that the drive mechanism, lubricating means and tool feed come into operation, in that order, as will appear presently.

A jointed linkage 77, 78 connects the portion of the main support structure 79 to a portion 80 of the drive frame 55. A stub shaft 81 is rotatably secured to portion 80 and link 78 is rigidly fixed to this shaft 81. Link 77 is pivotally attached, as at 82, to support structure portion 79 and pivotally connected with link 78 at 78'. Link 77 is of T shape having an upwardly extending leg 77' to which is pivotally attached link 83. An arm 84 is secured to shaft 53 for rotation therewith and its bifurcated free end is pivotally secured to link 83. Thus, as shaft 53 rotates in a counter-clockwise direction from that position shown in Figure 2, link 83 will straighten the linkage 77, 78 to a near dead center position so that it will lock the main shaft 53 in operative position. This movement has swung drive frame 55 upwardly, about shaft 53, and brought belts 63 into driving engagement with the workpiece 25 as previously described. The sequence of the operation of this arrangement is such that the drive belts 63 do not come into contact with the workpiece until the clamping rollers 39, 40 are in operative engagement with the workpiece, that is to say, until the cam follower 48 is bearing on the cam surface 75. In the reverse operation, the locking rollers will not become disengaged from the workpiece until the belts 63 are free of the workpiece.

Compound control lever 30 comprises a shaft rotating or a main actuating member section 86 having a handle portion 87 and a tool feed section 88 having a bifurcated outer end portion 89. The shaft rotating section 86 is pivotally connected between bifurcated portion 89 by its web 90 at its underside and the connection is such that it allows relative movement between the sections 86, 88 in only a vertical direction. Feed section 88 is pivotally connected, as previously described to tool holder 31 and swinging arm 33. Secured to shaft 53 at its right end is an arm 92 which is connected with shaft rotating section 86 at 93 by the rod 94. Swivel joint member 95, is pivotally connected to handle section 86 at 93 and to joint member 96, on the end of rod 94, at 97. Joint member 98 pivotally connects the other end of rod 94 to the bifurcated part of arm 92 for swinging movement in either direction.

The machine as shown in Figure 2 is in the inoperative position. After the workpiece has been positioned on the pairs of supporting rollers 37, 38 by the operator's left hand, which is free to load and unload the machine, the shaft rotating section 86 of control handle is swung upwardly to its limit in the horizontal position where it will remain unsupported by the operator due to the supporting action of linkage 77, 78 which has locked shaft 53 in the operating position. This upward swinging of the control handle first serves to bring the clamping rollers 39, 40 into engagement with the workpiece, then swings the drive belts 63 into engagement with the piece and at that time starts a flow of lubricant from the sump or oil pan 100 onto the tool 32 by the following pump means.

Figure 3:
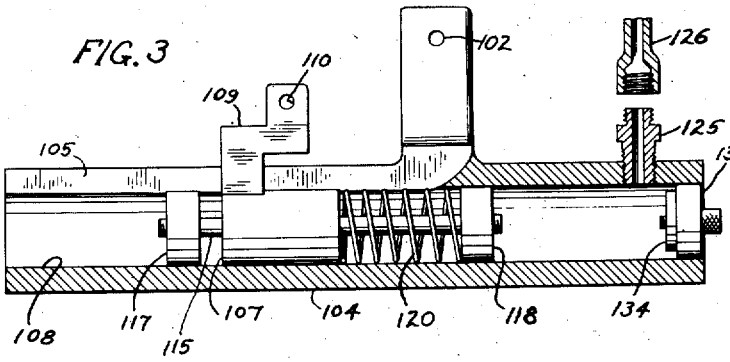
Figure 3 is a sectional view, on an enlarged scale, showing the lubricant supplying means.
Figure 4:
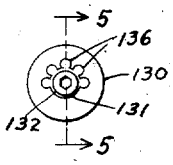
Figure 4 is an elevational rear view of the valve for the lubricant supplying means shown in Figure 3.
Figure 5:
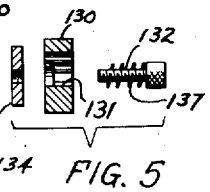
Figure 5 is an exploded view, in section, of the valve taken on line 5—5 of Figure 4.

Secured to the leg member 11 as at 102 is a cylinder 104 which is immersed in the lubricant fluid (not shown) in drip pan 100. The cylinder 104 has a slot 105 on its upper side which extends along part of the cylinder length. A guide 107 is slidable in bore 108 and has secured thereto, and extending through slot 105 an arm 109 having an aperture 110 in its upper end. Linkage means connects shaft 53 and guide 107 and comprises a bifurcated member 112 secured to shaft 53 and a link 113 pivotally connects member 112 with arm 109 of the guide 107. Guide 107 has a bore extending through it in which is slidable a rod 115 having a threaded portion at either end. Piston 118 and stop member 117 are threadably engaged on the ends of rod 115 as shown in Figure 3. A compression spring 120 is mounted over rod 115 between guide 107 and the piston 118. An outlet connection 125 is secured in a tapped hole near the end of cylinder 104 and has secured to it a conduit 126 supported by post 127 and terminating at 128, as shown in Figure 1, where the tool 32 engages the workpiece.

The inlet for this pump comprises a disk 130 having a central bore 131 through which extends the thumb screw 132 threadably engaged in the valve plate 134. Disk 130 also has a series of fluid inlet apertures 136 extending therethrough. Yieldable means in the form of a compression spring 137 is mounted on screw 132 and serves to bias the valve plate 134 against disk 130 and thereby seal the inlet openings 136. The disk 130 is press fitted into the bore 108 and thus forms a tight fit.

When the piston is moved to the left, as viewed in Figure 3, by rotation of shaft 53, this suction stroke lifts the valve plate against the action of spring 137, off of the disk 130 and fluid from sump 100 is drawn into the cylinder. On the pumping stroke, the piston moving to the right effectively causes the fluid to seal plate 134 against disk 130. When shaft 53 is rotated, by lever section 86, from the position shown in Figure 2, the member 112, through link 113, forces the guide 107 to the right. Due to the resistance of the oil in the cylinder the spring 120 is compressed and guide 107 slides over rod 115 and relative to piston 118. The spring 120 then gradually forces the piston 118 to the right until stop member 117 bears against guide 107, thus forcing lubricant fluid out of the cylinder through conduit 126 and over the tool 32. With this arrangement, this retarded pumping action commences before the tool engages the workpiece and continues only for the centering or drilling operation. The pumping rate is of course predeterminable by the compressive strength of the spring 120. The lubricant so discharged on the tool drains back into pan 100 for reuse.

Summary

A compound control handle is provided which is operable by one hand of the operator and leaves his other hand free to load, reverse the workpiece, and unload the machine. The initial movement of the handle serves to clamp the workpiece in rotatable position, apply the driving means to the piece, lock the main actuating shaft in operative position and set the pump means in operation to supply a predetermined amount of lubricant at a given rate. At this time the operator shifts the lever 30 to the left, as he faces the machine, to thereby feed the tool 32 into the workpiece. Both movements of the control handle 30, i. e., the upward and leftward motions, are accomplished by an easy sweeping motion which is a simple and quick operation.

The conveniently located pump is simple in construction and is "cocked" by a simple movement of the guide 107 to discharge a given amount of oil at a certain rate and at precisely the proper time in each cycle of machine operation.

In practice this machine has proved highly efficient, one operator producing as many as 900 finished shaft ends per hour within extremely close eccentricity tolerances.

What is desired to be secured by Letters Patent is:

1. In a machine having support structure for rotatably supporting a driven cylindrical workpiece; a pair of clamping rollers mounted on said structure for swinging between an inoperative and a workpiece clamping position; drive means for said workpiece mounted on said structure for swinging between an inoperative and a workpiece driving position; a feedable tool mounted on said structure; said machine having a lubricant pump means adapted to discharge adjacent said tool; a main actuating member operatively mounted on said structure; connecting means between said member and said clamping rollers adapted to swing said rollers between an inoperative and a workpiece clamping position upon movement of the member, lockable connection means between said member and said drive means adapted to swing said drive means upon movement of said member and lock said drive means in the workpiece driving position, second connecting means between said member and said pump means for actuating said pump means upon movement of said member; a lever pivotally connected with said structure and with said tool for shifting the latter, said lever also connected with said main actuating member for movement thereof.

2. A device as described in claim 1 further characterized in that said lever comprises; a tool feeding section pivoted to said structure and said tool for movement therewith, an actuating member section pivotally connected with said tool feeding section and also connected with said member for actuating the latter.

3. In a centering and drilling machine having support structure for rotatably supporting a driven cylindrical workpiece; a pair of clamping rollers mounted on said structure for swinging between an inoperative and a workpiece clamping position; drive means for said workpiece mounted on said structure for swinging between an inoperative and a driving position; a feedable tool mounted on said structure; said machine having a lubricant pump means adapted to discharge adjacent said tool; a main actuating member rotatably mounted on said structure, means secured to said member for swinging said clamping rollers, second means connected between said member and drive means for swinging the latter, connecting means between said pump means and member adapted to actuate the former when the latter is rotated; a compound lever having a feed section pivotally mounted to said structure and said tool for positioning the latter, said lever also having a member rotating section pivotally attached to said feed section and operatively connected with said member for rotating the latter.

4. A device as set forth in claim 3 further characterized in that said pump means comprises, a cylinder, a piston slidable within said cylinder, an inlet valve in said cylinder adapted to open on a suction stroke of said piston and close on a pumping stroke, said lever having a connection to said piston for actuation thereof.

5. In a machine having support structure for rotatably supporting a driven cylindrical workpiece; a pair of clamping rollers mounted on said structure for swinging between an inoperative and a workpiece locking position; drive means for said workpiece mounted on said structure for swinging between an inoperative and a driving position; a tool slidably mounted on said structure and adapted to be positionable in an inoperative or a workpiece engaging position; said machine having a lubricant pumping means adapted to discharge adjacent said tool; a main actuating shaft rotatably mounted on said structure, means secured to said shaft for swinging said clamping rollers, second means connected between said shaft and frame for swinging the latter, connecting means between said pumping means and shaft adapted to activate the former when the latter is rotated; a compound lever having a feed section pivotally mounted to said structure and said tool for positioning the latter, said lever also having a shaft rotating section pivotally attached to said feed section and operatively connected with said shaft for rotating the latter.

6. In a centering machine having support structure for rotatably supporting a driven cylindrical workpiece; a pair of clamping rollers mounted on said structure for swinging between an inoperative and a workpiece clamping position; flexible drive means for said workpiece mounted on said structure for swinging between an inoperative and a workpiece driving position, a feedable tool mounted on said structure and a lubricant pumping means on said machine including a cylinder having a piston slidable therein, and adapted to discharge adjacent said tool; a main actuating shaft rotatably mounted on said structure, cam means secured to said shaft for swinging said clamping rollers, linkage means connected between said shaft and frame for swinging the latter, connecting link means between said piston and shaft adapted to shift the former when the latter is rotated; a compound lever having a feed section pivotally mounted to said structure and said tool for positioning the latter, said lever also having a shaft rotating section pivotally attached to said feed section and operatively connected with said shaft for rotating the latter, whereby movement of the shaft rotating section will swing the clamping rollers and drive means into operative engagement with said workpiece and actuate the pump means and subsequent movement of said compound lever will position said tool in engagement with said workpiece.

7. A device as recited in claim 6 further characterized in that said linkage means comprises a pair of links pivotally connected together which are adapted to assume a substantially straight position to hold said shaft in operative position.

8. In a machine having a cutting tool and a control lever for positioning said tool; lubricant pump means comprising, a cylinder having a guide slidable therein, means connecting said lever with said guide for sliding the latter within said cylinder, a piston slidably connected to said guide for movement relative thereto, yieldable means between said guide and said piston adapted to urge them apart whereby said piston delivers a pumping stroke after said lever has slid said guide, second means forming a fluid communication between said cylinder and said tool.

9. A device as defined in claim 8 further characterized in that said machine has a lubricant sump located directly beneath said tool for catching lubricant passing thereover, said pump means mounted within said sump, said second means comprising a fluid conduit connected at one end with said cylinder and having its discharge end adjacent said tool.

10. In a machine having a support structure for rotatably supporting a driven cylindrical workpiece, a clamping roller mounted on said structure for swinging between an inoperative and a workpiece clamping position; flexible drive means mounted on said structure for swinging between an inoperative and a workpiece driving position; a feedable tool mounted on said structure; said machine also having a lubricant pump means adapted to discharge lubricant on said tool, a main actuating member operatively mounted on said structure and connected with said clamping roller, said drive means, and said pump means, whereby initial movement of said member in one direction will swing said clamping roller into workpiece clamping position and actuate said pump and continued movement of said member will swing said drive means into workpiece driving position; a compound control lever pivotally connected with said structure and having an actuating section connected with said actuating member for operating the latter and also having a tool feeding section for operating said tool.

11. A device as defined in claim 10 further characterized in that said tool feed section is pivoted to said structure and said actuating section is pivotally connected to said tool feed section.

12. A device as defined in claim 10 further characterized in that said pump means comprises; a cylinder, a guide slidable within said cylinder, a piston slidably connected to said guide for movement relative thereto, yieldable means between said guide and said piston whereby said piston delivers a pumping stroke after said guide has been moved.

*13. In a machine having a support structure for rotatably supporting a driven cylindrical workpiece and also supporting shiftable parts, a feedable tool holder slidably mounted on said structure for movement toward and away from said workpiece and a main actuating member operatively mounted on said structure for actuating said parts, the improvement comprising, a compound control handle having a tool feed section pivotally connected between said structure and said holder, said handle also having*

*an actuating section pivotally secured to said feed section for swinging in a substantially vertical direction, linkage means connecting said member to said actuating section whereby when the latter is swung said member will be actuated and when said handle is moved said holder will be slid.*

*14. The structure defined in claim 13 further characterized in that said tool feed section is swingable in a substantially horizontal direction and said actuating section is pivoted on a substantially horizontal axis whereby said sections swing in a substantially horizontal direction as a rigid unit.*

*15. In a machine having a support structure for rotatably supporting a driven cylindrical workpiece, a feedable tool holder slidably mounted on said structure for movement toward and away from said workpiece, means mounted on said structure to drivingly embrace said workpiece and a main actuating member operatively connected to said means for actuation thereof, the improvement comprising, a compound control handle having a tool feed section pivotally connected between said structure and said holder, said handle also having an actuating section pivotally secured to said feed section for swinging in a substantially vertical direction, linkage means connecting said member to said actuating section whereby when the latter is swung said member will be actuated and both said sections are movable in a substantially horizontal direction as a rigid unit to slide said holder.*

References Cited in the file of this patent or the original patent

UNITED STATES PATENTS

| | | |
|---|---|---|
| 1,196,572 | Maynard | Aug. 29, 1916 |
| 1,290,874 | Baker et al. | Jan. 14, 1919 |
| 1,523,959 | Hanson | Jan. 20, 1925 |
| 2,106,216 | Johnson | Jan. 25, 1938 |
| 2,190,858 | Bennett | Feb. 20, 1940 |